(12) United States Patent
Arsene (10) Patent No.: US 7,735,290 B2
(45) Date of Patent: Jun. 15, 2010

(54) WIND TURBINE ASSEMBLY TOWER

(75) Inventor: Florin Arsene, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 615 days.

(21) Appl. No.: 11/249,202

(22) Filed: Oct. 13, 2005

(65) Prior Publication Data

US 2007/0095008 A1 May 3, 2007

(51) Int. Cl.
*E04C 3/00* (2006.01)
(52) U.S. Cl. .................. 52/651.01; 52/651.07; 52/836; 416/DIG. 6; 248/127
(58) Field of Classification Search ........... 52/40, 52/146, 110, 651.01, 651.02, 651.03, 651.04, 52/651.07, 651.08, 836; 290/55; 343/890, 343/891, 892; 248/127, 158; 416/DIG. 6
See application file for complete search history.

(56) References Cited

U.S. PATENT DOCUMENTS

| | | | | |
|---|---|---|---|---|
| 187,078 | A * | 2/1877 | Adams | 52/40 |
| 490,267 | A * | 1/1893 | Burnham et al | 52/40 |
| 865,580 | A * | 9/1907 | Eubank | 52/40 |
| D84,905 | S * | 8/1931 | Tate | D10/114 |
| 2,145,232 | A * | 1/1939 | Bauer | 52/736.1 |
| 2,181,938 | A * | 12/1939 | Fine | 52/292 |
| 2,761,531 | A * | 9/1956 | Anderson | 52/292 |
| 2,784,556 | A * | 3/1957 | Perdue | 60/398 |
| 3,360,288 | A * | 12/1967 | Holscher | 52/638 |
| 3,447,276 | A * | 6/1969 | Svensson et al. | 52/651.07 |
| 3,959,946 | A * | 6/1976 | Holmes et al. | 52/845 |
| 4,178,124 | A | 12/1979 | Puskas | |
| 4,323,331 | A | 4/1982 | Schachle et al. | |
| 4,403,916 | A * | 9/1983 | Skelskey | 416/14 |
| 5,151,610 | A * | 9/1992 | St-Germain | 290/55 |
| 5,319,901 | A * | 6/1994 | Goldsworthy et al. | 52/651.02 |
| 5,375,353 | A * | 12/1994 | Hulse | 40/217 |
| 5,537,125 | A * | 7/1996 | Harrell et al. | 343/878 |
| 5,855,103 | A * | 1/1999 | Moore | 52/651.02 |
| 5,870,877 | A * | 2/1999 | Turner | 52/651.02 |
| 6,206,614 | B1 * | 3/2001 | Blevins et al. | 405/224 |
| 6,320,273 | B1 | 11/2001 | Nemec | |
| 6,465,901 | B2 * | 10/2002 | Croes | 290/55 |
| 6,614,125 | B2 * | 9/2003 | Willis et al. | 290/55 |
| 6,668,498 | B2 * | 12/2003 | Ritz | 52/148 |
| 6,868,646 | B1 | 3/2005 | Perina | |
| 6,888,264 | B1 | 5/2005 | Willis et al. | |
| 6,948,290 | B2 * | 9/2005 | Ritz | 52/651.02 |
| 7,156,586 | B2 | 1/2007 | Nim | |
| 7,218,013 | B2 | 5/2007 | Platt | |
| 7,392,624 | B2 * | 7/2008 | Kinzer | 52/194 |
| 2002/0047277 | A1 * | 4/2002 | Willis et al. | 290/55 |
| 2003/0205021 | A1 * | 11/2003 | Ryan | 52/736.1 |

(Continued)

*Primary Examiner*—Robert J Canfield
*Assistant Examiner*—Brent W Herring
(74) *Attorney, Agent, or Firm*—James McGinness, Esq.; Armstrong Teasdale LLP (57) ABSTRACT

A method for constructing a tower having a length along a longitudinal axis defined by the tower includes assembling a first tower section including three first legs. Each first leg diverges from the longitudinal axis along a length of the first leg. A second tower section is assembled. The second tower section includes three second legs each extending substantially parallel to the longitudinal axis. The three second legs at least partially define a passage through the second tower section. The second tower section is coupled to the first tower section.

8 Claims, 5 Drawing Sheets

U.S. PATENT DOCUMENTS

2004/0169376 A1* 9/2004 Ruer et al. .................... 290/55
2005/0166521 A1 8/2005 Silber
2007/0006541 A1* 1/2007 Seidel ......................... 52/292
2007/0151194 A1* 7/2007 Livingston et al. ....... 52/651.05

* cited by examiner

WIND TURBINE ASSEMBLY TOWER

STATEMENT REGARDING FEDERALLY SPONSORED RESEARCH & DEVELOPMENT

The U.S. Government may have certain rights in this invention pursuant to contract number DE-AC36-99GO10337.

BACKGROUND OF THE INVENTION

This invention relates generally to wind turbine assemblies and, more particularly, to a tower for supporting wind turbine assemblies.

Recently, wind turbine generators have received increased attention as an environmentally safe and relatively inexpensive alternative energy source. With this growing interest, considerable efforts have been made to develop wind turbine generators that are reliable and efficient.

Generally, a wind turbine generator includes a rotor having multiple blades. The rotor is mounted on a housing or nacelle, which is positioned on top of a truss or tubular tower. Utility grade wind turbine generators (i.e., wind turbine generators designed to provide electrical power to a utility grid) can have large rotors (e.g., 30 or more meters in diameter). Blades on these rotors transform wind energy into a rotational torque or force that drives one or more generators rotationally coupled to the rotor.

Many conventional wind turbine assemblies include a tower formed of a single tubular construction, commonly referred to as a "monopole." Conventional monopoles have been used in the art to provide sufficient clearance for rotor blades to rotate freely without undesirable contact with the tower structure. Further, such monopoles are required to have a height sufficient to facilitate the harnessing of wind energy. Thus, conventional monopoles are custom fabricated of a heavy material, such as steel, having a sufficient thickness and/or a sufficient diameter to support heavy loads and/or forces associated with the wind turbine assembly. This custom fabrication requires many hours of fabrication and a large quantity of material. Further, monopoles are limited in diameter to about 14 feet or 168 inches (4300 mm) due to road transportation barriers, such as bridges that span a highway at a distance of about 14 feet above the road surface.

BRIEF DESCRIPTION OF THE INVENTION

In one aspect, the present invention provides a method for constructing a tower having a length along a longitudinal axis defined by the tower. The method includes assembling a first tower section including three first legs. Each first leg diverges from the longitudinal axis along a length of the first leg. A second tower section is assembled. The second tower section includes three second legs each extending substantially parallel to the longitudinal axis and at least partially defining a passage through the second tower section. The second tower section is coupled to the first tower section.

In another aspect, a tower is provided. The tower includes a longitudinal axis defined along a length of the tower. A first tower section includes three first legs. Each first leg diverges from the longitudinal axis along a length of the first leg. At least one support member couples the adjacent first legs. A second tower section is coupled to the first tower section. The second tower section includes three second legs. Each second leg extends substantially parallel to the longitudinal axis. A passage is defined through the second tower section.

In another aspect, the present invention provides a wind turbine assembly. The wind turbine assembly includes a tower having a length along a longitudinal axis defined by the tower. A lower tower section includes three legs. Each leg diverges from the longitudinal axis along a length of the lower tower section. At least one support member couples adjacent legs. An upper tower section is coupled to the lower tower section. The upper tower section includes three legs. Each leg extends substantially parallel to the longitudinal axis. A passage is defined through the upper tower section and extends at least partially along the length of the tower. A transition piece is coupled to the upper tower section. The wind turbine assembly also includes a generator mounted to the upper tower section. A rotatable hub is operatively coupled to the generator and a plurality of rotor blades are mounted to the hub.

DETAILED DESCRIPTION OF THE INVENTION

Figure 1:
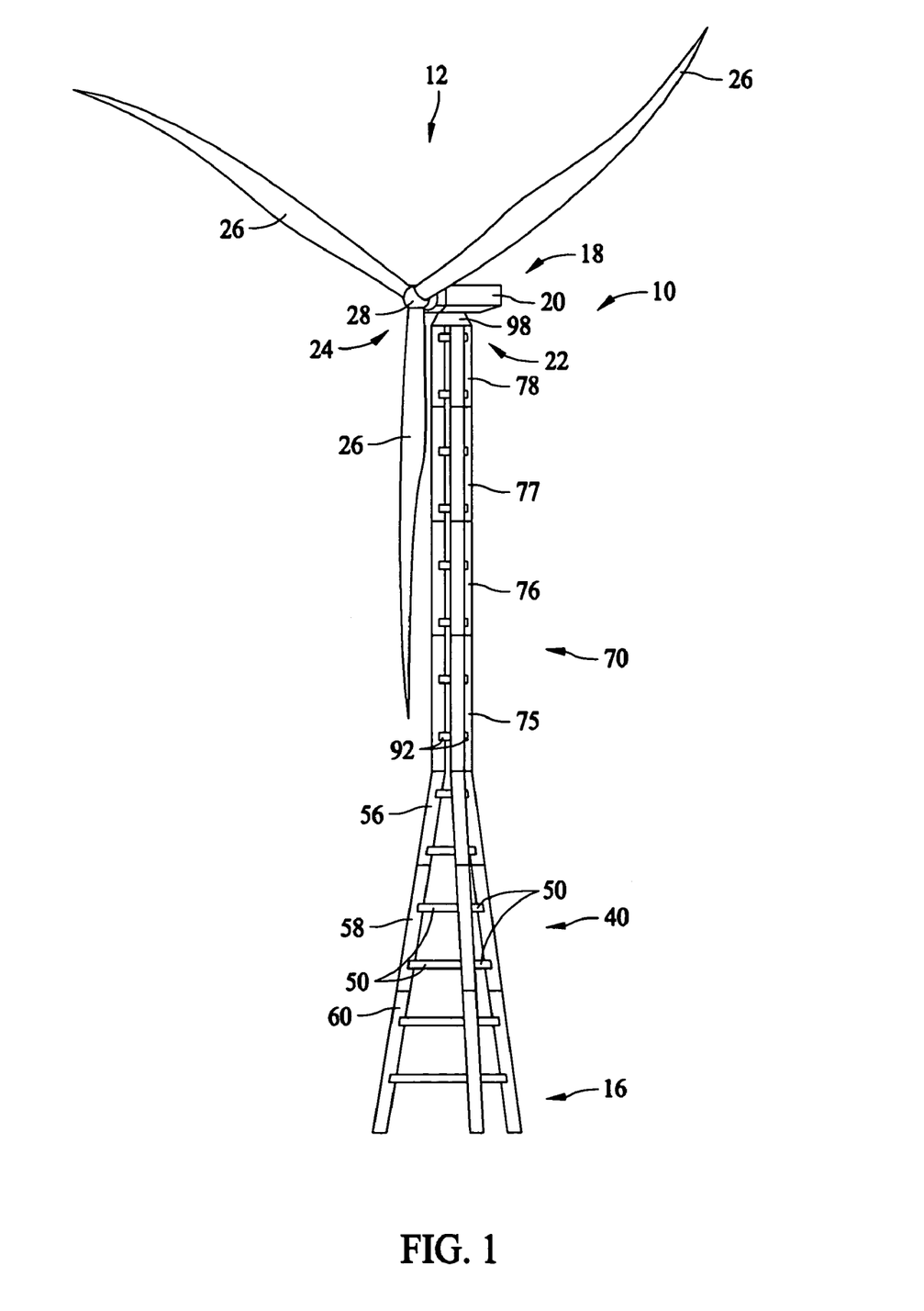
FIG. 1 is perspective view of a wind turbine assembly, according to one embodiment of this invention.
Figure 3:
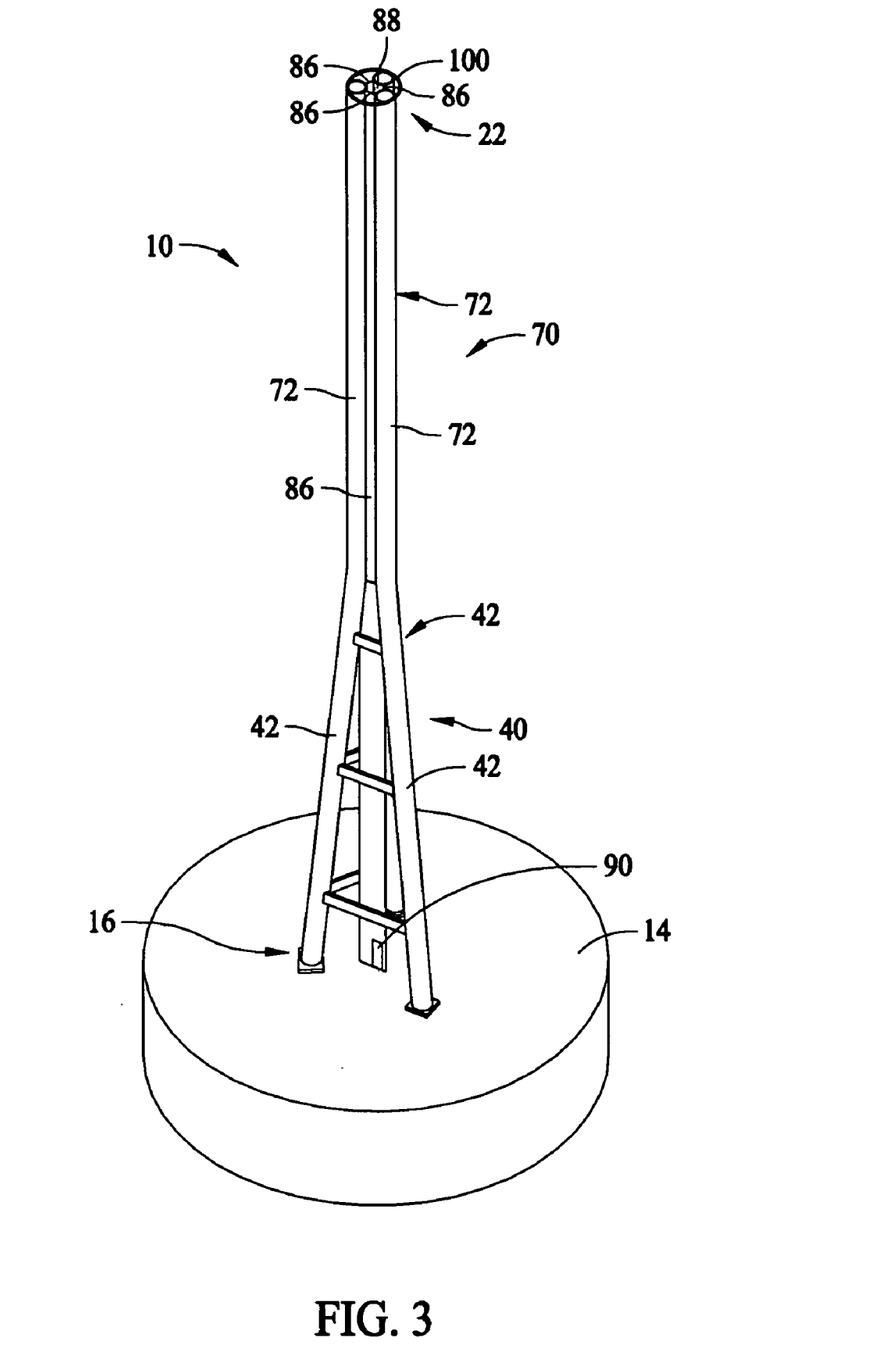
FIG. 3 is a perspective view of a wind turbine assembly tower, according to one embodiment of this invention.

The present invention provides a tower 10 for supporting a wind turbine assembly 12, as shown in FIG. 1, and a method for constructing tower 10. Tower 10 has a foundation 14 at a base portion 16 of tower 10 that is buried at least partially in the ground, as shown in FIG. 3. A wind turbine generator 18 is mounted atop tower 10. In one embodiment, wind turbine generator 18 includes a nacelle 20 housing a generator (not shown in FIG. 1). Nacelle 20 is mounted to a top portion 22 of tower 10. Wind turbine generator 18 also includes a rotor 24 that includes a plurality of rotor blades 26 attached to a rotating hub 28. Although wind turbine generator 18 illustrated in FIG. 1 includes three rotor blades 26, there are no specific limits on the number of rotor blades 26 utilized in connection with the present invention.

Figure 2:
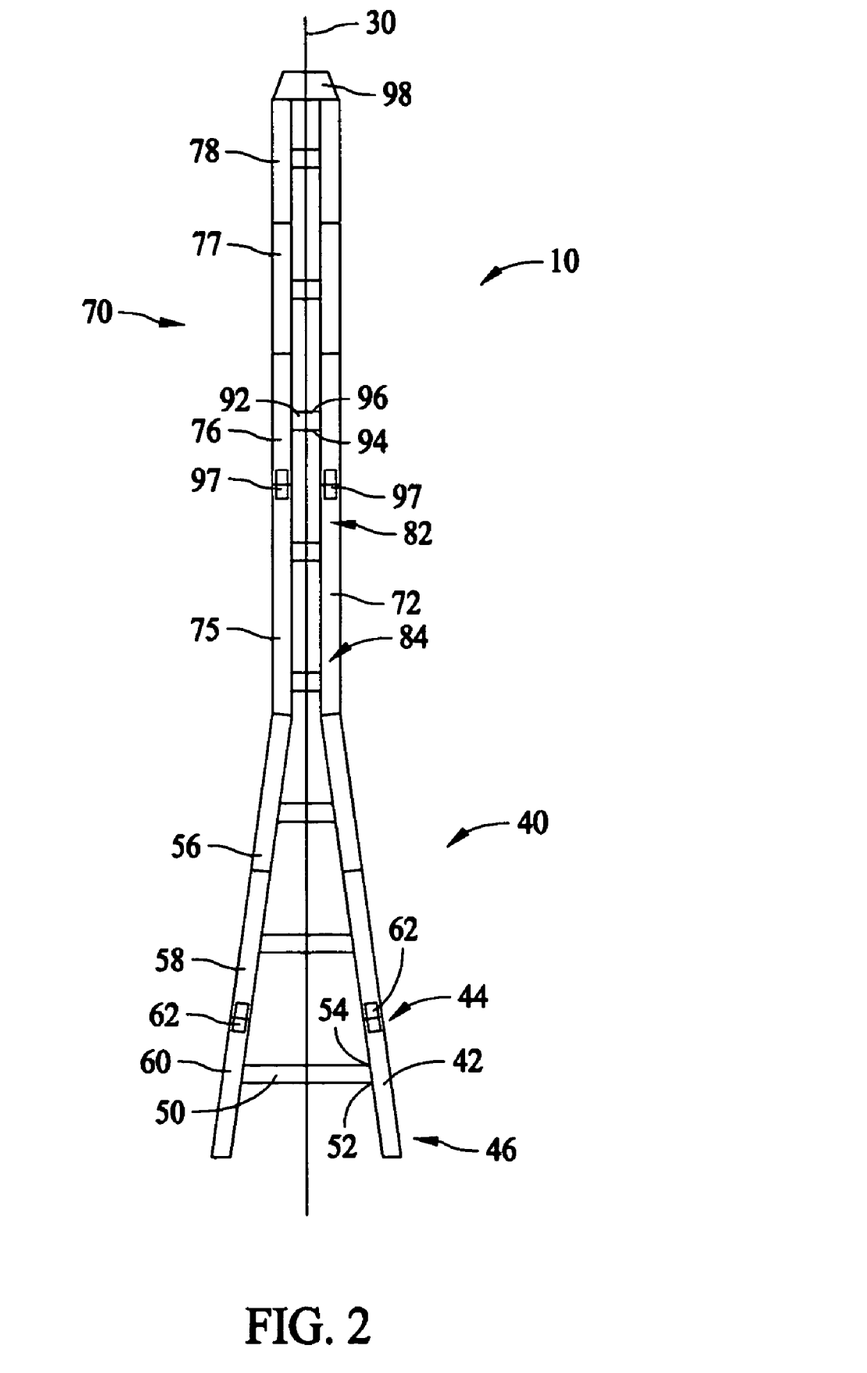
FIG. 2 is a side view of a wind turbine assembly tower, according to one embodiment of this invention.

Referring further to FIG. 2, tower 10 defines a longitudinal axis 30 along a length of tower 10. In one embodiment, tower 10 includes at least one first or lower tower section 40, which includes three first legs 42. In this embodiment, first legs 42 are substantially straight. In an alternative embodiment, at least a portion of each first leg 42 has an arcuate shape. First legs 42 are fabricated of a steel material and formed in a substantially tubular configuration, such as by forming a rolled pipe, having a diameter not greater than about 5 feet. Alternatively, first legs 42 are fabricated from a plurality of steel plates that are folded, for example using a cold or hot bending process, and welded together to form a pipe having a polygonal cross-sectional area. The polygonal pipe may have any suitable number of sides, such as 3 sides to 24 sides. In alternative embodiments, first legs 42 are fabricated from a suitable material including, without limitation, a suitable metal, alloy and/or composite material.

Unlike conventional towers, in one embodiment, tower 10 is constructed of a plurality of tower sections each having three legs. The three leg construction facilitates the use of less material and/or lighter materials to fabricate the legs and/or other components of the tower sections. Thus, the dimensions and/or weight of each leg, as well as the overall dimensions and/or weight of tower 10, are reduced. In a particular embodiment, the weight of tower 10 is at least about 25% lighter than a conventional monopole tower having a same height. In alternative embodiments, each tower section of tower 10 includes any suitable number of legs, such as two legs or four or more legs.

Each first leg 42 diverges from longitudinal axis 30 along a length of first leg 42 to form a tapered first tower section 40. As a result, a horizontal distance from an upper portion 44 of first leg 42 to longitudinal axis 30 is less than a horizontal distance from a lower portion 46 of first leg 42 to longitudinal axis 30. Tapered first tower section 40 and/or diverging first legs 42 facilitate decreasing a load of wind turbine assembly 12 applied to foundation 14 through first legs 42. In one embodiment, at least one structural support member, such as at least one beam 50, couples adjacent first legs 42, as shown in FIG. 1. Beam 50 is fabricated of any suitable material and has any suitable cross-sectional shape, such as described in reference to first legs 42. In one embodiment, at least one tab 52 is coupled to first leg 42 such as by welding tab 52 to first leg 42. Beam 50 is mateably engageable with a corresponding aperture 54 formed in beam 50 to couple beam 50 to each adjacent first leg 42.

In one embodiment, first tower section 40 includes a plurality of first tower subsections, such as 56, 58 and 60, as shown in FIG. 1. Referring further to FIGS. 1 and 2, first tower subsections 56, 58, 60 are coupled together such that each first leg 42 of adjacent first tower subsections are linearly aligned. In one embodiment, an external flange 62 couples each first leg 42 of first section first subsection 56 to a corresponding first leg 42 of first tower second subsection 58. In a particular embodiment, flange 62 has an arcuate shape that corresponds to an outer surface of first legs 42. An upper portion of first tower second subsection 58 is coupled to a bottom portion of first tower first subsection 56. First tower second subsection 58 includes three first legs 42. Each first leg 42 is linearly aligned with a corresponding first leg 42 of first tower first subsection 56. In alternative embodiments, any suitable coupler, either external or internal to first legs 42, can be used to couple first tower subsections 56, 58, 60.

As shown in FIGS. 1 and 2, tower 10 includes at least one second or upper tower section 70, which includes three second legs 72. Second tower section 70 is coupled to first tower section 40. As shown in FIGS. 1 and 2, wind turbine assembly 12 includes a plurality of coupled first tower subsections 56, 58, 60 and a plurality of coupled second tower subsections 75, 76, 77, 78 coupled to first tower first subsection 56.

In one embodiment, second legs 72 are fabricated of a steel material and formed in substantially tubular configuration having a diameter not greater than about 5 feet. Alternatively, second legs 72 are fabricated from a plurality of steel plates that are folded, for example using a cold or hot bending process, and welded together to form a pipe having a polygonal cross-sectional area. The polygonal pipe may have any suitable number of sides, such as 3 sides to 24 sides. In alternative embodiments, second legs 72 are fabricated from a suitable material including, without limitation, a suitable metal, alloy and/or composite material.

Figure 4:
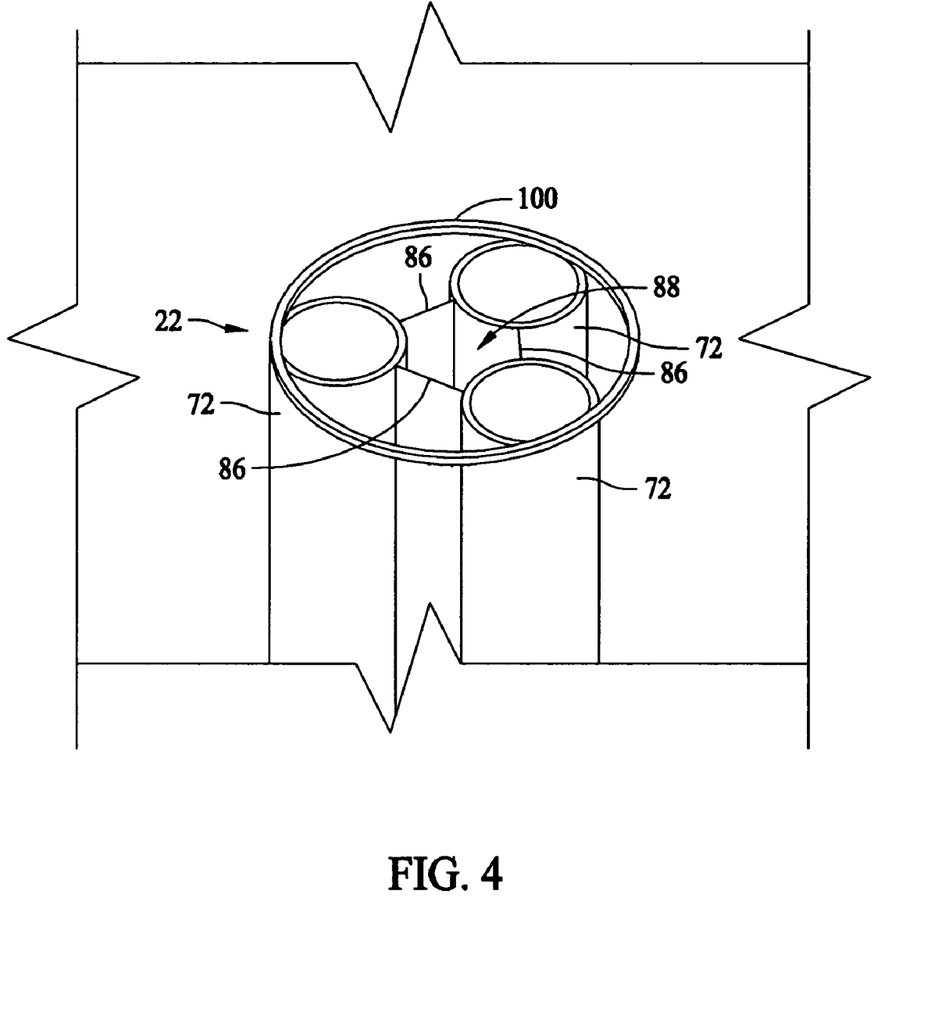
FIG. 4 is a perspective view of a portion of the wind turbine assembly tower shown in FIG. 3.
Figure 5:
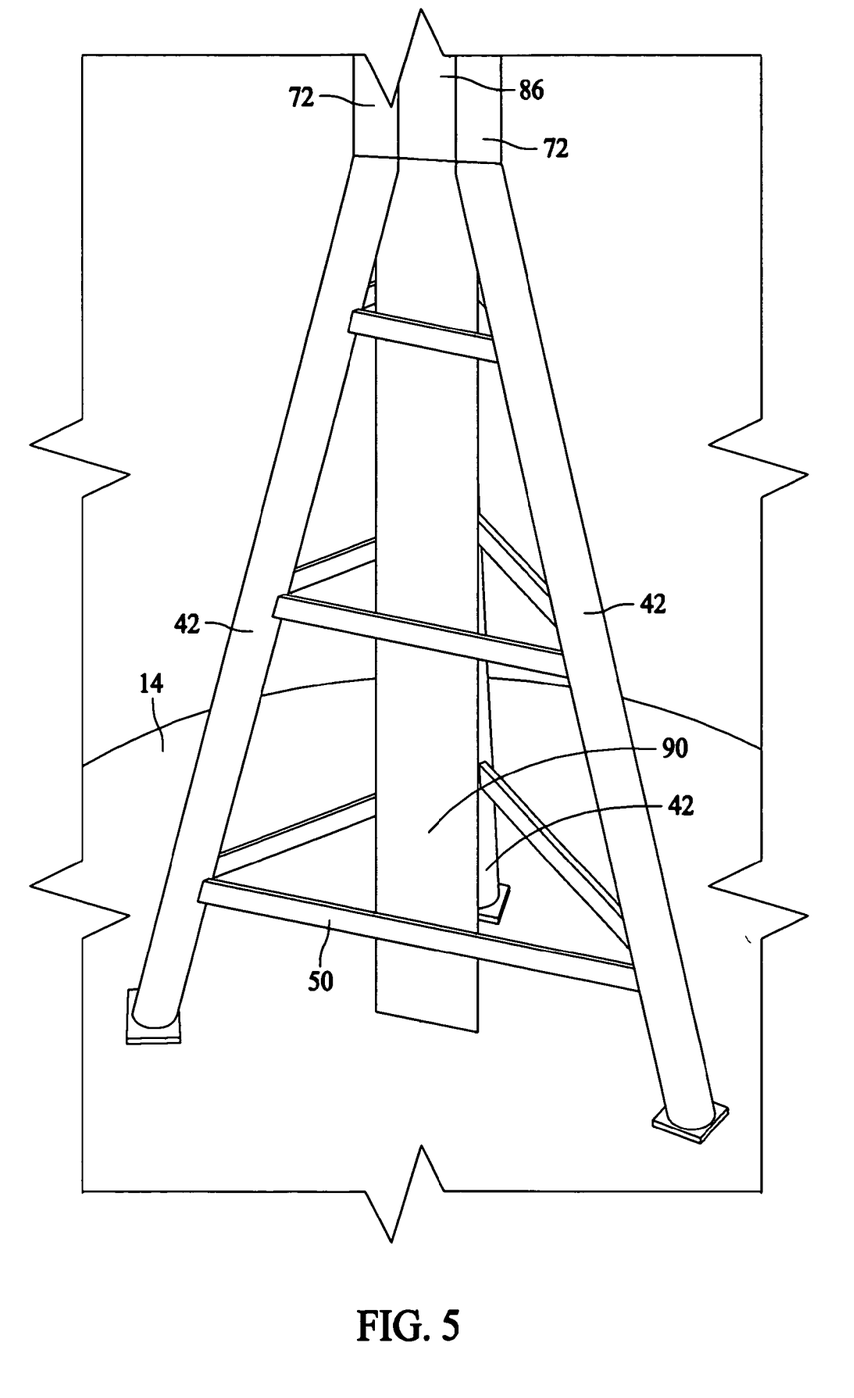
FIG. 5 is a perspective view of a portion of the wind turbine assembly tower shown in FIG. 3.

Each second leg 72 is substantially parallel with longitudinal axis 30 along a length of second leg 72 to provide sufficient clearance between second tower section 70 and rotor blades 26 to allow rotor blades 26 to rotate freely without undesirable contact with tower 10. As a result, a horizontal distance from an upper portion 82 of second leg 72 to longitudinal axis 30 is substantially equal to a horizontal distance from a lower portion 84 of second leg 72 to longitudinal axis 30. In one embodiment, a shear panel 86 is positioned between and couples adjacent second legs 72, as shown in FIGS. 3-5, to increase a torsion stiffness of upper tower section 70 and tower 10. Shear panel 86 is connected to adjacent second legs 72 using suitable connectors, such as bolts, screws and/or at least one weld. In a particular embodiment, shear panel 86 has a thickness of about ⅜ inch (about 9.525 mm). Further, shear panel 86 has a width extending substantially perpendicular to longitudinal axis 30 of about 5 feet (about 1.524 meters) and a length extending along longitudinal axis 30 of about twenty feet (about 6.096 meters). In an alternative embodiment, at least one support bar (not shown) is positioned generally horizontal to stiffen shear panel 86.

Referring to FIGS. 3 and 5, in one embodiment, each shear panel 86 extends at least partially along second tower section 70. The plurality of shear panels 86 connect adjacent second legs 72 and at least partially defines a passage 88 having a generally triangular cross-sectional area. Passage 88 houses electrical wires and/or wind turbine assembly components that operatively couple wind turbine assembly 12 and/or wind turbine generator 18 to a utility grid, for example, to provide electrical power to the utility grid. In this embodiment, passage 88 is substantially enclosed by shear panels 86 to facilitate protecting the housed electrical wires and/or wind turbine assembly components from environmental conditions. Further, passage 88 provides access through a center portion of tower 10 along at least a portion of the length of tower 10 to wind turbine assembly 12 to facilitate maintenance and/or repair of tower 10 and/or wind turbine assembly 12. In one embodiment, an access chamber 90 is positioned on foundation 14 and coupled to shear panels 86 to provide access through access chamber 90 to passage 88 to further facilitate maintenance and/or repair of tower 10 and/or wind turbine assembly 12.

In an alternative embodiment, at least one structural support member, such as at least one beam 92, similar or identical to beam 50, couples adjacent second legs 72. As shown in FIGS. 1 and 2, the plurality of beams 92 and coupled second legs 72 at least partially define passage 88. Beam 92 is fabricated of any suitable material and has any suitable cross-sectional shape, such as described in reference to second legs 72. In one embodiment, at least one tab 94 is coupled to second leg 72 such as by welding tab 94 to second leg 72. Tab 94 is mateably engageable with a corresponding aperture 96 formed in beam 92 to couple beam 92 to second leg 72.

In one embodiment, second tower section 70 includes a plurality of second tower subsections, such as subsections 75, 76, 77, 78, as shown in FIGS. 1 and 2. Second tower subsections 75, 76, 77, 78 are coupled together such that each second leg 72 of coupled second tower sections 75, 76, 77, 78 are linearly aligned. For example, a bottom portion of second tower second subsection 76 is mounted to a top portion of second tower first subsection 75 and each second leg 72 of second tower second subsection 76 is linearly aligned with a corresponding second leg 72 of second tower first subsection 75. In one embodiment, an external flange 97 couples each second leg 72 of second tower first subsection 75 to a corresponding second leg 72 of second tower second subsection 76. In alternative embodiments, any suitable coupler, external to or internal to second tower subsections 75, 76, 77 and/or 78, couples second tower subsections together.

A transition piece 98 is mounted to a top portion of second tower subsection 78, as shown in FIG. 2. Transition piece 98 facilitates coupling wind turbine assembly 12 to tower 10. In an alternative embodiment, transition piece 98 includes a ring 100 positioned about second legs 72 at top portion 22 of tower 10, as shown in FIGS. 3 and 4.

In one embodiment, a method for constructing tower 10 includes assembling at least one first or lower tower section 40 including three first legs 42. Each first leg 42 is configured to diverge from longitudinal axis 30 along a length of first leg 42, e.g., from a first end to a second end of first leg 42. Each first leg 42 is fabricated of a steel material and formed in a substantially tubular configuration, such as by forming a rolled pipe. Alternatively, each first leg is fabricated of a folded plate pipe. The folded plate pipe is constructed of at least one folded plate, such as two folded plates, that are folded or bent to form a pipe having a polygonal cross-sectional area. The plates are bent using a suitable bending process, such as cold bending or hot bending. Any suitable folding or bending process known in the art may be used to bend the at least one plate. The bent plates are welded together longitudinally using a suitable weld, such as a butt weld or a groove weld, to form the folded plate pipe.

In one embodiment, at least one beam 50 is coupled between adjacent first legs 42 to provide structural support to first tower section 40. For example, one beam 50 can be coupled between adjacent first legs 42, as shown in FIG. 2, or two beams 50 can be coupled between adjacent first legs 42, as shown in FIG. 1. In alternative embodiments, any suitable number of beams 50 is coupled between adjacent first legs 42 to provide sufficient support to first tower section 40. In a particular embodiment, each beam 50 forms an aperture 54 at each opposing end of beam 50. Tab 52 mateably engages with aperture 54 to couple adjacent first legs 42. In an alternative embodiment, a plurality of tabs 52 is formed on or integrated with first leg 42.

In one embodiment, tower 10 includes a plurality of first tower subsections 56, 58, 60 coupled together such that each first leg 42 of adjacent first tower subsections 56, 58, 60 are linearly aligned. In one embodiment, flange 62 couples each first leg 42 of first tower first subsection 56 to a corresponding first leg 42 of first tower second subsection 58. In alternative embodiments, any suitable coupler can be used to couple first tower subsections.

At least one second or upper tower section 70 including three second legs 72 is assembled. Each second leg 72 is configured to extend substantially parallel to longitudinal axis 30. In one embodiment, each second leg 72 is fabricated of a steel material and formed in a substantially tubular configuration, such as by forming a rolled pipe. Alternatively, each second leg 72 is fabricated of a folded plate pipe, as described above in reference to first legs 42. It is apparent to those skilled in the art and guided by the teachings herein provided that second tower section 70 can be assembled before, during or after the assembly of first tower section 40.

In one embodiment, shear panel 86 is connected between adjacent second legs 72, as shown in FIGS. 3-5, to provide torsion stiffness to second tower section 70 and tower 10. As shown in FIG. 4, shear panels 86 at least partially define passage 88 that extends along a length of second tower section 70. In an alternative embodiment, at least one beam 92 is coupled between adjacent second legs 72 to provide structural support to second tower section 70. For example, one beam 92 can be coupled between adjacent second legs 72, as shown in FIG. 2, or two beams 92 can be coupled between adjacent second legs 72, as shown in FIG. 1.

Referring further to FIGS. 1 and 2, in one embodiment, tower 10 includes a plurality of second tower subsections coupled together such that each second leg 72 of adjacent second tower subsections are linearly aligned. For example, a bottom portion of second tower second subsection 76 is mounted to a top portion of second tower first subsection 75 and each second leg 72 of second tower second subsection 76 is linearly aligned with a corresponding second leg 72 of second tower first subsection 75. In one embodiment, a flange 97 couples each second leg 72 of second tower first subsection 75 to a corresponding second leg 72 of second tower second subsection 76. In alternative embodiments, any suitable coupler couples adjacent second tower subsections.

Second tower section 70 is then coupled to first tower section 40. In one embodiment, flange 62 and/or 97 couples each first leg 42 to a corresponding second leg 72 to couple first leg 42 to second leg 72. In alternative embodiments, any suitable coupler couples first tower section 40 to second tower section 70. Further, first tower subsections and/or second tower subsections can be coupled together with any suitable coupler.

The above-described tower and method for constructing the tower facilitate optimizing the construction of a wind turbine assembly. More specifically, the tower and the method for constructing the tower provide parameters for optimizing a face width, a leg diameter, a leg material thickness and/or a beam size. Such optimization provides a tower having a weight that is at least about 25% less than a weight of a conventional tower.

Exemplary embodiments of a tower and a method for constructing the tower are described above in detail. The tower and method are not limited to the specific embodiments described herein, but rather, elements or components of the tower and/or the method steps may be utilized independently and separately from others described herein. Further, the described tower elements or components and/or the method steps can also be defined in, or used in combination with, other towers and/or methods for constructing the tower and are not limited to practice only as described herein.

While the invention has been described in terms of various specific embodiments, those skilled in the art will recognize that the invention can be practiced with modification within the spirit and scope of the claims.

What is claimed is:

1. A tower for a wind turbine assembly, said tower comprising:
   a longitudinal axis defined along a length of said tower;
   a first tower section comprising three first legs, each first tower section first leg diverging from said longitudinal axis along a length of said first tower section first leg, and at least one support member coupling adjacent first tower section first legs;
   a second tower section coupled to said first tower section, said second tower section comprising three second legs, each second tower section second leg extending substantially parallel to said longitudinal axis, said second tower section further comprising a second tower first subsection and a second tower second subsection, a top portion of said second tower first subsection coupled to a bottom portion of said second tower second subsection, said second tower first subsection and said second tower second subsection each comprising three second legs, each second leg of said second tower second subsection linearly aligned with and coupled to a corresponding said second leg of said second tower first subsection to form each second tower section second leg;
   a plurality of shear panels, each shear panel of said plurality of shear panels connected between adjacent second tower section second legs and extending along said longitudinal axis to increase a torsion stiffness of said second tower section, said plurality of shear panels and said second tower section second legs at least partially defining and substantially enclosing a passage that extends through said second tower section to a top portion of said tower; and an access chamber extending along said longitudinal axis within said first tower section, said access chamber coupled to said plurality of shear panels and cooperating with said passage to facilitate access between said first tower section and said second tower section.

2. A tower in accordance with claim 1 further comprising at least one support member coupling adjacent second tower section second legs, each adjacent second tower section second leg having a tab positionable within a corresponding aperture formed in said at least one support member.

3. A tower in accordance with claim 1 wherein said first tower section comprises a first tower first subsection and a first tower second subsection, a top portion of said first tower second subsection coupled to a bottom portion of said first tower first subsection, said first tower second subsection including three first legs, each first leg of said three first legs linearly aligned with a corresponding first leg of said first tower first subsection.

4. A tower in accordance with claim 3 further comprising a flange coupling each first leg of said first tower first subsection and a corresponding first leg of said first tower second subsection.

5. A tower in accordance with claim 1 further comprising a flange coupling each second leg of said second tower second subsection and said corresponding second leg of said second tower first subsection.

6. A tower in accordance with claim 1 further comprising a transition piece mounted to a top portion of said second tower section.

7. A wind turbine assembly comprising:
a tower having a length along a longitudinal axis defined by said tower, said tower comprising:
 a lower tower section comprising three first legs, each lower tower section first leg diverging from said longitudinal axis along a length of said lower tower section first legs, and at least one support member coupling adjacent lower tower section first legs;
 an upper tower section coupled to said lower tower section, said upper tower section comprising three second legs, each upper tower section second leg extending substantially parallel to said longitudinal, said upper tower section further comprising an upper tower first subsection and an upper tower second subsection, a top portion of said upper tower first subsection coupled to a bottom portion of said upper tower second subsection, said upper tower first subsection and said upper tower second subsection each comprising three second legs, each second leg of said upper tower second subsection linearly aligned with and coupled to a corresponding second leg of said upper tower first subsection to form each upper tower section second leg;
 a plurality of shear panels, each shear panel of said plurality of shear panels connected between adjacent upper tower section second legs and extending along said longitudinal axis to increase a torsion stiffness of said upper tower section, said plurality of shear panels and said upper tower section second legs at least partially defining and substantially enclosing a passage that extends through said upper tower section to a top portion of said tower;
 an access chamber extending along said longitudinal axis within said lower tower section, said access chamber coupled to said plurality of shear panels and cooperating with said passage to facilitate access between said lower tower section and said upper tower section; and
 a transition piece coupled to said upper tower section;
a generator mounted to said transition piece;
a rotatable hub operatively coupled to said generator; and
a plurality of rotor blades mounted to said hub.

8. A wind turbine assembly in accordance with claim 7 wherein said passage houses at least one of an electrical wire and a wind turbine assembly component operatively coupling said generator to a utility grid.

* * * * *